(12) United States Patent
Nobutani

(10) Patent No.: US 9,449,161 B2
(45) Date of Patent: Sep. 20, 2016

(54) INFORMATION PROCESSING APPARATUS AND METHOD, AND NON-TRANSITORY COMPUTER READABLE MEDIUM FOR PERMITTING EXECUTION OF AN INSTRUCTION IN A CASE WHERE FIRST BIOMETRIC INFORMATION AND SECOND BIOMETRIC INFORMATION ARE DIFFERENT

(71) Applicant: FUJI XEROX CO., LTD., Minato-ku, Tokyo (JP)

(72) Inventor: Naoya Nobutani, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 203 days.

(21) Appl. No.: 14/271,663

(22) Filed: May 7, 2014

(65) Prior Publication Data

US 2015/0049923 A1    Feb. 19, 2015

(30) Foreign Application Priority Data

Aug. 14, 2013    (JP) .................................. 2013-168596

(51) Int. Cl.
| | | |
|---|---|---|
| *G06F 21/32* | (2013.01) | |
| *G06F 21/41* | (2013.01) | |
| *G06F 21/51* | (2013.01) | |
| *G06F 21/52* | (2013.01) | |
| *G06F 21/60* | (2013.01) | |

(52) U.S. Cl.
CPC .............. *G06F 21/32* (2013.01); *G06F 21/41* (2013.01); *G06F 21/51* (2013.01); *G06F 21/52* (2013.01); *G06F 21/608* (2013.01); *G06F 2221/2141* (2013.01)

(58) Field of Classification Search
None
See application file for complete search history.

(56) References Cited

U.S. PATENT DOCUMENTS 7,908,629 B2 *    3/2011    Lewis ................ H04N 1/00132
                                                348/14.09
8,558,663 B2 *    10/2013    Newman ................ G06Q 20/40
                                                235/379

(Continued)

FOREIGN PATENT DOCUMENTS

| JP | 2005-301539 A | 10/2005 |
|---|---|---|
| JP | 2006081147 A | 3/2006 |
| JP | 2007235437 A | 9/2007 |

(Continued)

OTHER PUBLICATIONS

Communication dated Jun. 21, 2016, from the Japanese Patent Office in counterpart application No. 2013-168596.

*Primary Examiner* — Siamak Harandi
(74) *Attorney, Agent, or Firm* — Sughrue Mion, PLLC

(57) ABSTRACT

An information processing apparatus includes an instruction accepting unit, an obtaining unit, an extraction unit, a determination unit, and a permission unit. The instruction accepting unit is configured to accept an instruction from a user. The obtaining unit is configured to obtain an image. The extraction unit is configured to extract first biometric information and second biometric information from the image obtained by the obtaining unit. The determination unit is configured to determine whether the first biometric information and the second biometric information are different. The permission unit is configured to permit execution of the instruction accepted by the instruction accepting unit in a case where the determination unit determines that the first biometric information and the second biometric information are different.

10 Claims, 10 Drawing Sheets

(56) References Cited

U.S. PATENT DOCUMENTS

2005/0224573 A1 10/2005 Yoshizane et al.
2006/0056666 A1 3/2006 Mizutani et al.

FOREIGN PATENT DOCUMENTS

| JP | 2007249466 A | 9/2007 |
|---|---|---|
| JP | 2012-74935 A | 4/2012 |

* cited by examiner

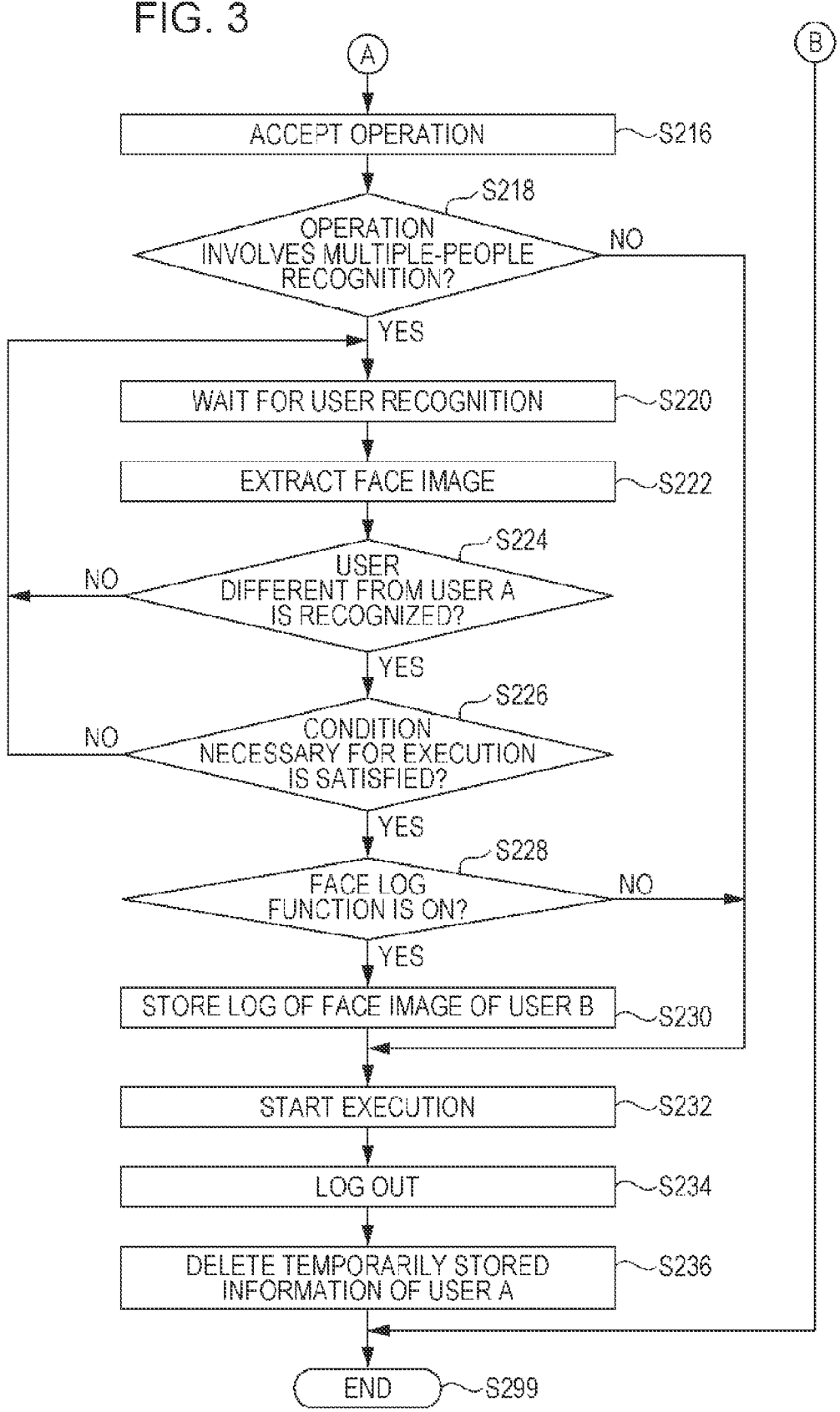

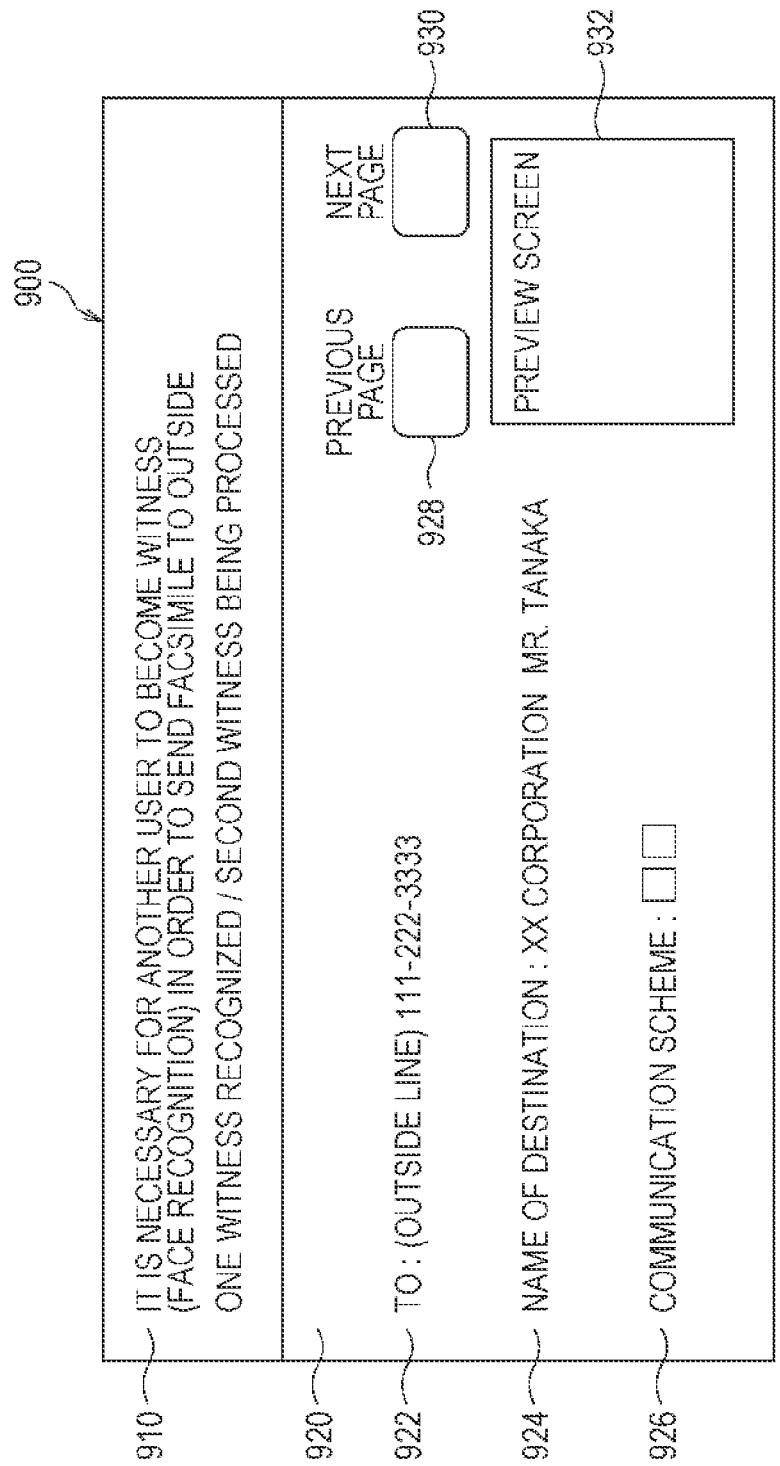

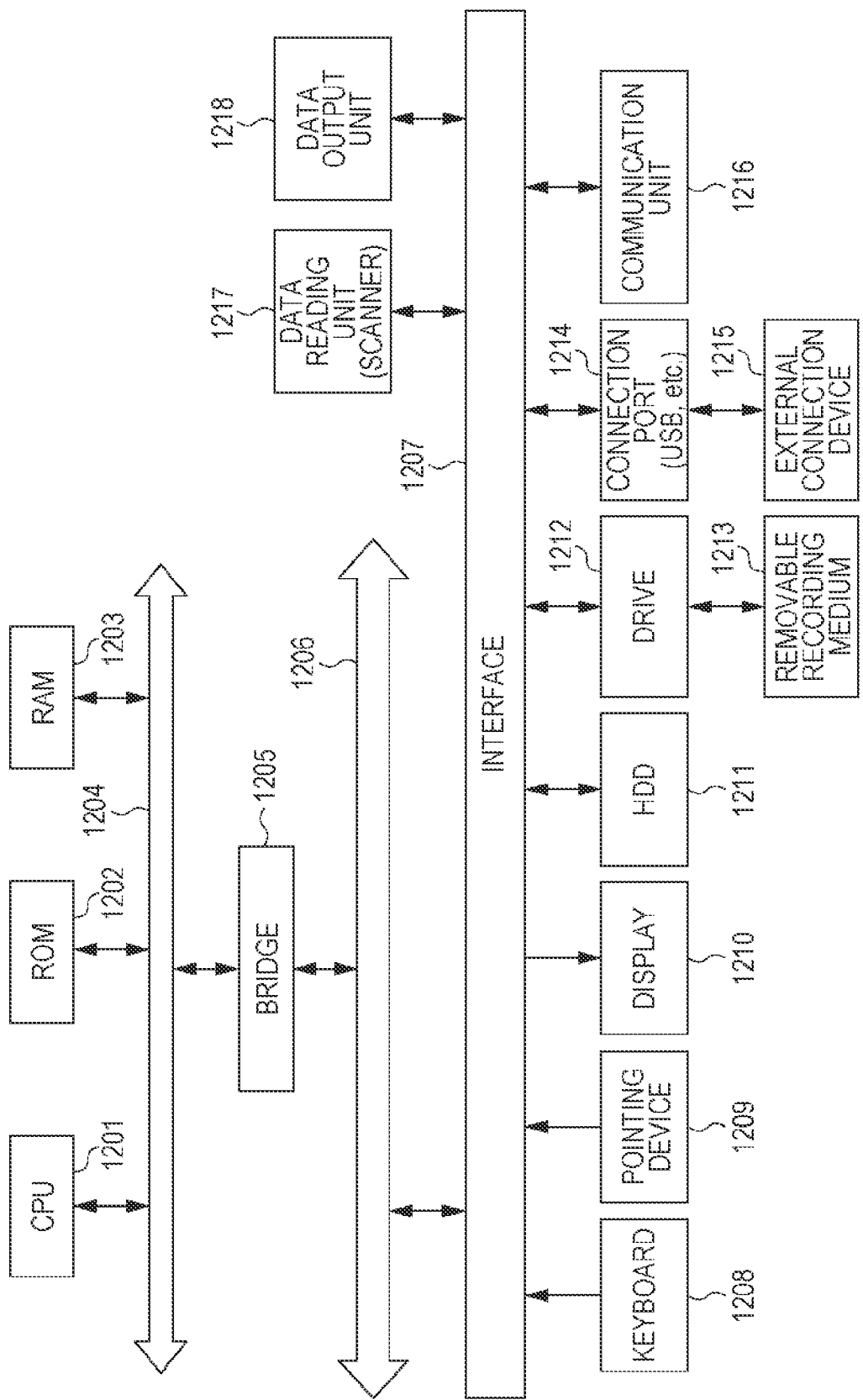

INFORMATION PROCESSING APPARATUS AND METHOD, AND NON-TRANSITORY COMPUTER READABLE MEDIUM FOR PERMITTING EXECUTION OF AN INSTRUCTION IN A CASE WHERE FIRST BIOMETRIC INFORMATION AND SECOND BIOMETRIC INFORMATION ARE DIFFERENT

CROSS-REFERENCE TO RELATED APPLICATIONS

This application is based on and claims priority under 35 USC 119 from Japanese Patent Application No. 2013-168596 filed Aug. 14, 2013.

BACKGROUND

Technical Field

The present invention relates to an information processing apparatus and method, and a non-transitory computer readable medium.

SUMMARY

According to an aspect of the invention, there is provided an information processing apparatus including an instruction accepting unit, an obtaining unit, an extraction unit, a determination unit, and a permission unit. The instruction accepting unit is configured to accept an instruction from a user. The obtaining unit is configured to obtain an image. The extraction unit is configured to extract first biometric information and second biometric information from the image obtained by the obtaining unit. The determination unit is configured to determine whether the first biometric information and the second biometric information are different. The permission unit is configured to permit execution of the instruction accepted by the instruction accepting unit in a case where the determination unit determines that the first biometric information and the second biometric information are different.

BRIEF DESCRIPTION OF THE DRAWINGS

An exemplary embodiment of the present invention will be described in detail based on the following figures, wherein:

FIG. 3 is a flowchart illustrating the exemplary process according to the exemplary embodiment;

FIG. 9 is a diagram illustrating an example of a facsimile setting screen;

FIG. 12 is a block diagram illustrating a hardware exemplary configuration of a computer realizing the exemplary embodiment.

DETAILED DESCRIPTION

First, before a description of an exemplary embodiment of the invention, technology serving as a premise will be described. Note that this description is to facilitate the understanding of the exemplary embodiment.

There is an information processing apparatus that identifies a user by authenticating the user. For example, various techniques are available, such as an authentication method for identifying a user with an integrated circuit (IC) card assigned to each user or by causing the user to enter his/her identification (ID) and password.

There are numerous techniques that limit the right to use a device or execution of a service or a job by performing authentication. However, in order to introduce such an authentication system, it is necessary to newly configure an authentication system, and, depending on customer data necessary for authentication or a system, it is necessary to configure a customer data server. This involves introduction costs and the maintenance and management costs of the database. Though a security function is necessary for a limited number of users in small- to medium-sized businesses or the like, because the load of introducing an authentication system is great, there are difficulties to decide to introduce an authentication system. In addition, because it is necessary to perform data collation with a database in order to verity a user for the purpose of authentication, it takes time to perform a collation process.

In execution control based on multiple-people authentication, it is necessary to authenticate a specific user, resulting in the burden of necessity of generation of and management costs of a management table. Upon execution of a specific service or job, it is necessary to specify a specific user who has the right to approve and to bring this user. Therefore, there is also a burden that it is necessary to remember who is a user who has the right to approve in order to execute a specific service or job. If such a user who has the right to approve is absent, it is impossible to execute the service or job, resulting in an obstacle to business operations.

Hereinafter, an exemplary embodiment of the invention will be described on the basis of the drawings.

Figure 1:
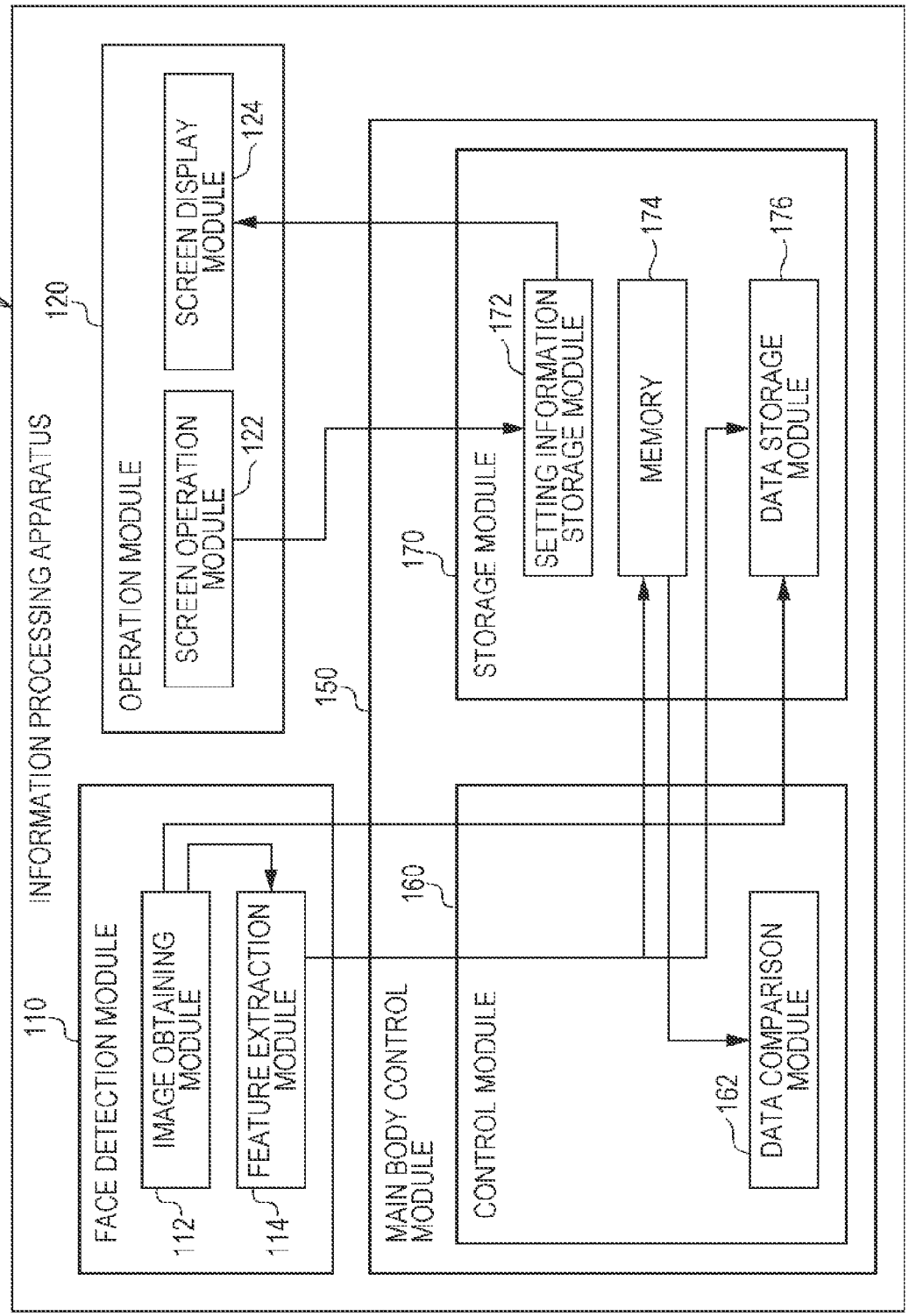
FIG. 1 is a conceptual module diagram of an exemplary configuration according to an exemplary embodiment of the invention.

FIG. 1 is a conceptual module diagram of an exemplary configuration according to the exemplary embodiment.

Note that the term "module" refers to components such as software (computer programs) and hardware which are typically capable of being logically separated. Consequently, the term "module" in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage apparatus is made to store information or that control is applied to cause a storage apparatus to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predetermined values", the predetermined values may be respectively different values, or two or more values (this obviously also includes the case of all values) which are the same. Additionally, statements to the effect of "B is conducted in the case of A" are used to denote that "a determination is made regarding whether or not A holds true, and B is conducted in the case where it is determined that A holds true". However, this excludes cases where the determination of whether or not A holds true is unnecessary.

Also, the term "system" or "apparatus" not only encompasses configurations in which multiple computers, hardware, or apparatuses are connected by a communication medium such as a network (including connections that support 1-to-1 communication), but also encompasses configurations realized by a single computer, hardware, or apparatus. The terms "apparatus" and "system" are used interchangeably. Obviously, the term "system" does not include merely artificially arranged social "constructs" (social systems).

Also, every time a process is conducted by each module or every time multiple processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be reduced or omitted in some cases. Note that the storage apparatus herein may include hard disks, random access memory (RAM), an external storage medium, storage apparatus accessed via a communication link, and registers, etc. inside a central processing unit (CPU).

An information processing apparatus 100 according to the exemplary embodiment controls a main body apparatus that executes a process (hereinafter may also be referred to as a "service" or a "job") in response to an instruction from a user. As illustrated in the example in FIG. 1, the information processing apparatus 100 includes a face detection module 110, an operation module 120, and a main body control module 150.

The main body apparatus controlled by the information processing apparatus 100 is preferably an apparatus that identifies a user by authenticating the user. The main body apparatus is, for example, a copier, a facsimile machine, a scanner, a printer, a multi-functional machine (an image forming apparatus with two or more of the functions of a scanner, a printer, a copier, a facsimile machine, and the like), or the like.

The information processing apparatus 100 detects that an instruction has been given in the presence of multiple people including a user and another person other than the user, and controls execution of a specific service or a specific job.

The face detection module 110 includes an image obtaining module 112 and a feature extraction module 114. The face detection module 110 is connected to a camera or the like, accepts an image, and extracts biometric information. Note that the term "biometric information" refers to information indicating a human being's physical features, which is used for so-called biometric authentication. In the exemplary embodiment, however, this information does not necessary be information for identifying that human being, and it is sufficient for this information to be information indicating that this human being is a person different from a user. Needless to say, this information may be biometric information for identifying a human being, such as a fingerprint, palm shape, retina, iris, face image, blood image, or the like. In addition, a camera that captures these images may be an infrared ray camera, for example, besides a general digital camera such as a charge coupled device (CCD) that captures a visible light. In the exemplary embodiment, a face image is mainly described as biometric information by way of example.

The operation module 120 includes a screen operation module 122 and a screen display module 124. The operation module 120 accepts an operation of a user on a keyboard, a mouse, a touch panel, or the like, and displays information to be presented to the user on a display device such as a display.

The main body control module 150 includes a control module 160 and a storage module 170.

The control module 160 includes a data comparison module 162. The control module 160 controls the main body apparatus.

The storage module 170 includes a setting information storage module 172, a memory 174, and a data storage module 176. The storage module 170 stores information necessary for control performed by the control module 160.

The image obtaining module 112 is connected to the feature extraction module 114 and to the data storage module 176 of the storage module 170. The image obtaining module 112 obtains an image. Here, the expression "to obtain an image" refers to capturing an image of a user or the like by a camera included in the information processing apparatus 100 and receiving the captured image. The camera captures an image of a user and another person other than the user. This other person may be anyone other than the user but is generally a person who belongs to the same organization (company, section, or the like) to which the user belongs and knows the user. This other person is, so to speak, a witness of the case in which the user causes the main body apparatus to perform a process. This other person may include a single person or multiple people (hereinafter the case of a single person will be illustrated by way of example). In addition, the image obtaining module 112 may capture multiple people (the user and the other person) in one shooting or multiple shootings. For example, the image obtaining module 112 may capture an image of one person (user) in the first shooting, and may capture a person other than the user in the second shooting. The first shooting may be a shooting for log in for using the main body apparatus.

The feature extraction module 114 is connected to the image obtaining module 112 and to the memory 174 and the data storage module 176 of the storage module 170. The feature extraction module 114 extracts first biometric information and second biometric information from an image obtained by the image obtaining module 112. As has been mentioned above, "an image obtained by the image obtaining module 112" may include a single image or multiple images. First biometric information and second biometric information are biometric information of a user whose image has been captured and biometric information of another person, other than the user, whose image has been captured. Either of first biometric information and second biometric information may be either of biometric information of a user and biometric information of another person other than the user. In addition, here, biometric information may be biometric information itself (image itself captured by the camera, such as a face image of a face portion) or a feature extracted from the biometric information. For example, a feature extracted from the face image may be a feature indicating a color distribution, a vector obtained as a result of extracting a segment(s), a face contour, the positions of the eyes, nose, and mouth, or the like, or may be the user ID or the like obtained as a result of person recognition.

The screen operation module 122 is connected to the setting information storage module 172 of the storage module 170. The screen operation module 122 accepts an instruction from a user. The screen operation module 122 accepts an instruction such as an instruction to send a facsimile. In addition, instructions may be classified into those that involve another person as a witness and those that are permitted to be performed only by a user.

The screen display module 124 is connected to the setting information storage module 172 of the storage module 170. The screen display module 124 displays information to be presented to a user on a display device such as a display. The details to be displayed will be described using examples illustrated in FIGS. 6 to 11.

The data comparison module 162 is connected to the memory 174 of the storage module 170. The data comparison module 162 determines whether first biometric information and second biometric information extracted by the feature extraction module 114 are different. In the case where it is determined that first biometric information and second biometric information are different, the main body apparatus, which is controlled by the information processing apparatus 100, is permitted to execute an instruction accepted by the screen operation module 122. In the above-described example, a facsimile is sent, for example, in response to the instruction. Note that the expression "first biometric information and second biometric information are different" refers to the fact that a user and another person other than the user are in front of the information processing apparatus 100. In short, it has been determined that confirmation has been made in the presence of another person other than the user, and execution is permitted. In the case where "first biometric information and second biometric information are different", there are items of biometric information of multiple people. This corresponds to the case in which, besides the case in which these items of biometric information are biometric information of different people, the case in which there are at least different items of biometric information. For example, there are three items of biometric information (A, B, and C); among them, two items of biometric information (A and B) are different, but two items of biometric information (B and C) may be biometric information of the same person. The "determination of whether these are different" may be performed by performing, for example, pattern matching, or it may be determined that these are different in the case where the distance between the two in a feature space is greater than or equal to a predetermined threshold. It is unnecessary to recognize a specific person from biometric information. Note that, after a specific person is identified from biometric information, whether these are different may be determined.

In addition, in the case where it is not determined that the first biometric information and the second biometric information are different, the data comparison module 162 does not permit execution of an instruction accepted by the screen operation module 122. Since, for example, an image of multiple people has not been captured, a message such as that indicating that no facsimile is permitted to be sent is presented. In the case where "it has not been determined that the first biometric information and the second biometric information are different", if there is biometric information of only one person, although there are multiple items of biometric information, these items may be of the same person, for example.

The setting information storage module 172 is connected to the screen operation module 122 and the screen display module 124 of the operation module 120. The setting information storage module 172 stores, for example, information set in the main body apparatus on the basis of an operation performed by the user on the screen operation module 122. In addition, the main body apparatus performs a process in accordance with the set information. For example, in the case of sending a facsimile, the set information corresponds to information such as an address; in the case of a copy process, the set information corresponds to a sheet size, the number of pages, etc.

The memory 174 is connected to the feature extraction module 114 of the face detection module 110 and to the data comparison module 162 of the control module 160. The memory 174 stores biometric information extracted by the feature extraction module 114. The stored biometric information is accessed and used by the data comparison module 162. Note that the storage here may be temporally storage (the memory 174 is a volatile memory).

The data storage module 176 is connected to the image obtaining module 112 and the feature extraction module 114 of the face detection module 110. The data storage module 176 stores an instruction accepted by the screen operation module 122 and first biometric information and second biometric information extracted by the feature extraction module 114 as a log. Needless to say, the data storage module 176 may store, for example, the date and time at which an instruction has been accepted (year, month, day, hours, minutes, seconds, milliseconds, or a combination of these), the ID of a user or the like identified from these items of biometric information, and a processing result indicating whether a process in response to the instruction has been performed. Note that the data storage module 176 is a non-volatile memory.

In addition, the data storage module 176 may not store the second biometric information as a log. This is because this other person only serves as a witness of the situation, and this is to make a person who is present in the situation to casually become a witness, and for the sake of privacy protection. In addition, whether to store the second biometric information as a log may be determined in accordance with the degree of importance of an instruction accepted by the screen operation module 122. For example, a table storing each instruction and its degree of importance may be prepared in advance, and the degree of importance of an instruction may be determined in accordance with the table. If the degree of importance is greater than or equal to a predetermined value, the second biometric information may be stored as a log. In addition, a message asking the witness whether to store the second biometric information as a log may be displayed, and the second biometric information may be stored when there is an operation to "store the second biometric information as a log".

Figure 2:
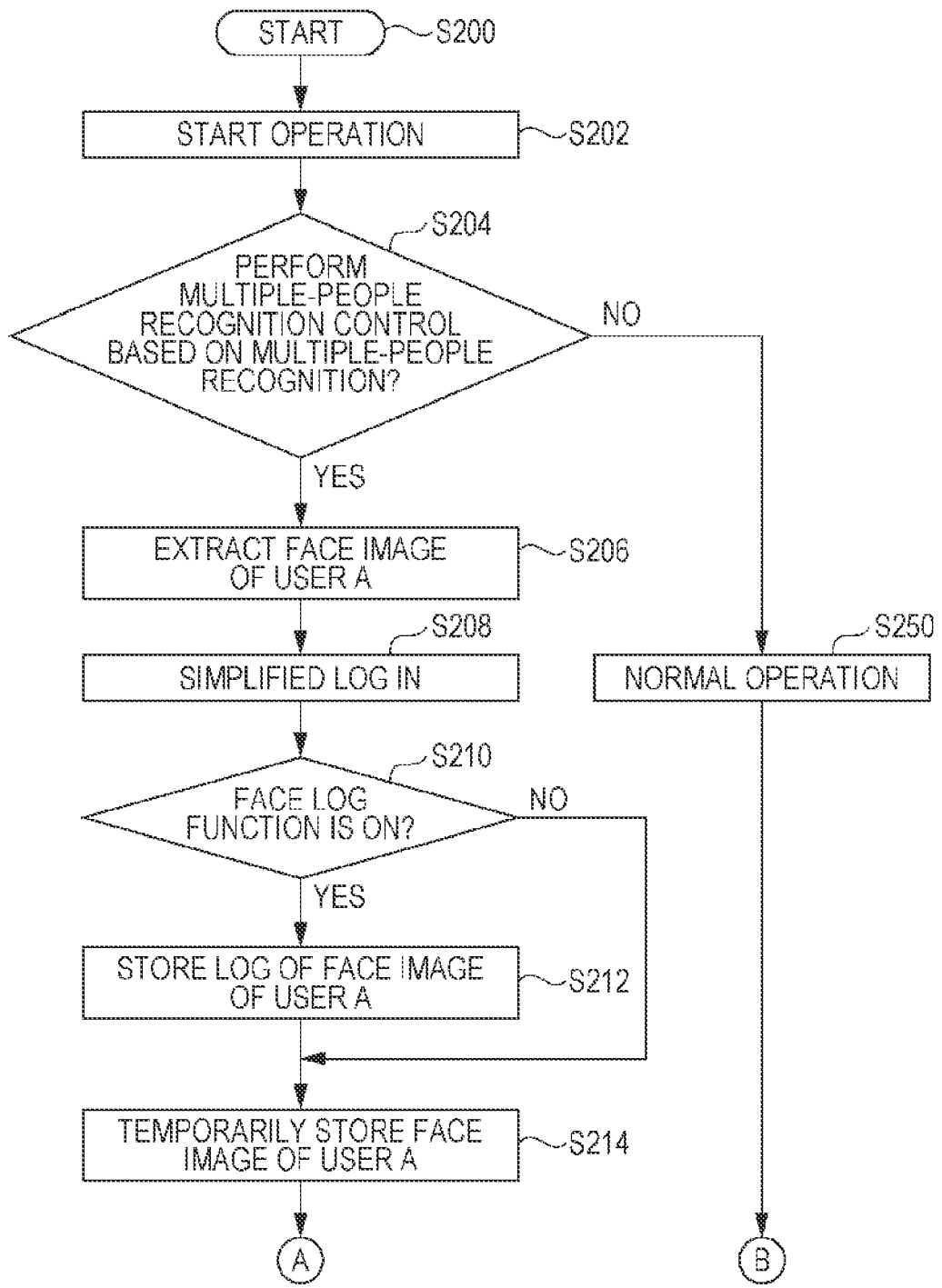
FIG. 2 is a flowchart illustrating an exemplary process according to the exemplary embodiment.
Figure 4A:
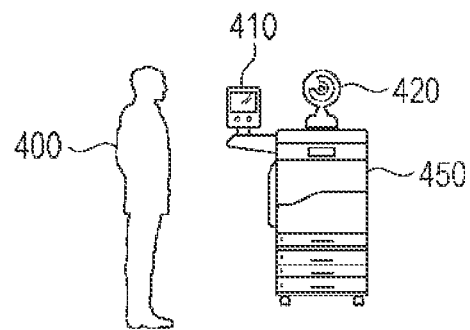
FIGS. 4A to 4D are diagrams illustrating the exemplary process according to the exemplary embodiment.
Figure 4B:
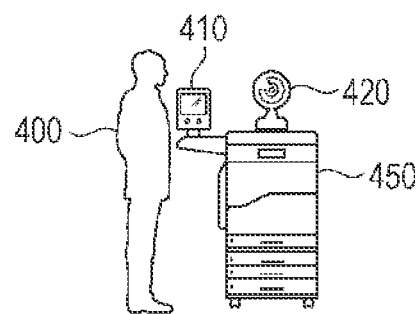
Figure 4C:
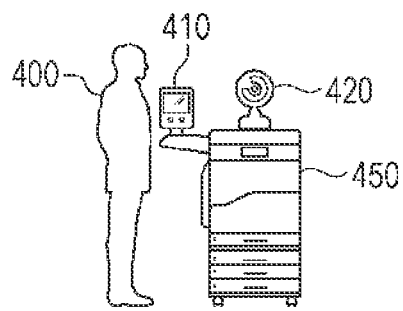
Figure 4D:
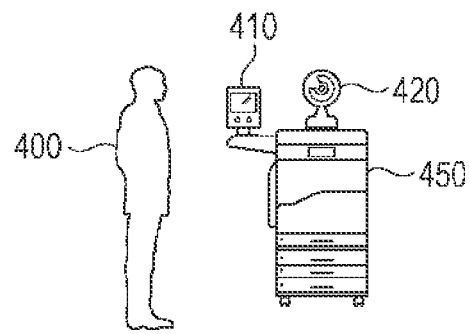
Figure 5E:
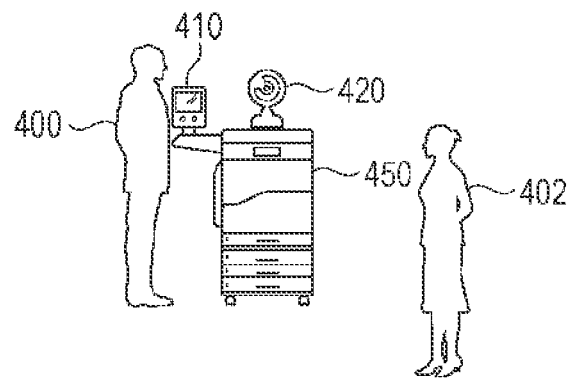
FIGS. 5E to 5H are diagrams illustrating the exemplary process according to the exemplary embodiment.
Figure 5F:
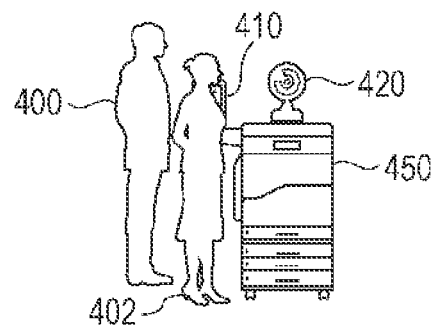
Figure 5G:
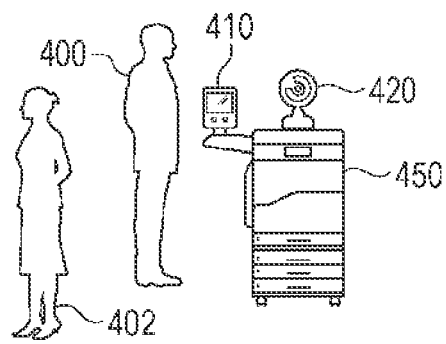
Figure 5H:
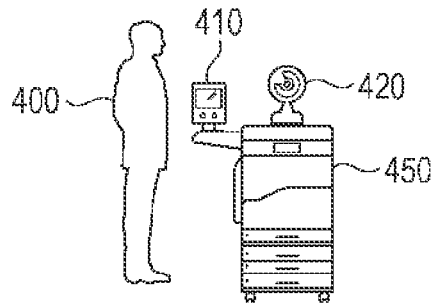

FIGS. 2 and 3 are flowcharts illustrating an exemplary process according to the exemplary embodiment. In addition, the exemplary process will be specifically described using examples illustrated in FIGS. 4A to 4D and 5E to 5H. Here, the main body apparatus is an image forming apparatus 450, and the image forming apparatus 450 includes an information processing apparatus 410 that is the information processing apparatus 100, and a camera 420 that transfers an image to the image obtaining module 112. In addition, details to be displayed on a display of the information processing apparatus 410 or the image forming apparatus 450 will be described using examples illustrated in FIGS. 6 to 9.

In step S202, a user starts operating the image forming apparatus 450. This will be described using the example illustrated in FIG. 4A. A user A400 comes to the image forming apparatus 450. For example, upon power activation or returning from power saving, a face recognition process, which is simplified log in described below, may be performed.

In step S204, it is determined whether to control a determination process by the information processing apparatus 410 (hereinafter may also be referred to as "multiple-people recognition"). If such control is to be performed, the process proceeds to step S206; otherwise, the process proceeds to step S250. In the case where it has been set to perform control based on multiple-people recognition by the information processing apparatus 410, the process proceeds to step S206.

Figure 6:
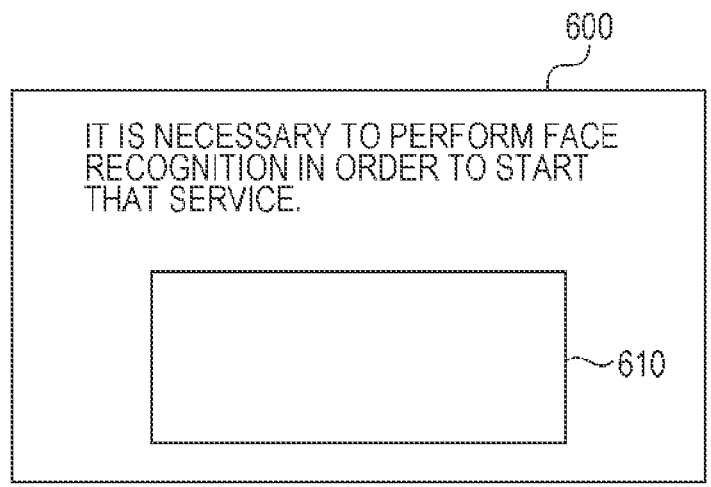
FIG. 6 is a diagram illustrating an example of a user recognition screen.

In step S206, a face image of the user A400 is extracted. The camera 420 captures an image of the user A400, and the feature extraction module 114 extracts a face image of the user A400. For example, a user recognition screen 600 is displayed. FIG. 6 is a diagram illustrating an example of the user recognition screen 600. The message "IT IS NECESSARY TO PERFORM FACE RECOGNITION IN ORDER TO START THAT SERVICE." is displayed in the user recognition screen 600. In a camera image output area 610, the image of the user A400 captured by the camera 420 may be output, and the current camera image may be confirmed. Alternatively, a mark may be displayed to draw attention, thereby causing the camera 420 to capture a face image of the user A400.

In step S208, simplified log in is performed. For example, the face image of the user A400 and the face images of registered people are subjected to pattern matching. If the user A400 is a registered person, log in is successful. In the case of successful log in, for example, a recognition message display area 800a is displayed. FIGS. 8A to 8D are diagrams illustrating examples of a recognition message display area 800, respectively. For example, the message "FACE RECOGNITION IS SUCCESSFUL" is displayed in the recognition message display area 800a as a message in the case where user verification is successful. In the case of unsuccessful log in, for example, a recognition message display area 800b is displayed. For example, the message "FACE RECOGNITION IS UNSUCCESSFUL" is displayed in the recognition message display area 800b as a message in the case where user verification is unsuccessful.

In step S210, whether a face log function is ON (whether a log storage process by the data storage module 176 has been set) is determined. In the case where the face log function is ON, the process proceeds to step S212; otherwise, the process proceeds to step S214.

In step S212, the face image of the user A400 is stored as a log in the data storage module 176.

In step S214, the face image of the user A400 is temporarily stored in the memory 174.

In step S216, an operation is accepted. This will be described using the example illustrated in FIG. 4B. In response to an instruction operation performed by the user A400, the user of a facsimile service, which involves multiple-people recognition, is started. An instruction (service, job, etc.) serving as a target that involves multiple-people recognition is settable. For example, such an instruction may be set by the administrator using a dedicated screen.

In step S218, it is determined whether the operation is an operation involving multiple-people recognition. In the case where the operation is an operation involving multiple-people recognition, the process proceeds to step S220; otherwise, the process proceeds to step S232. An operation involving multiple-people recognition is an instruction involving another person as a witness.

Figure 7:
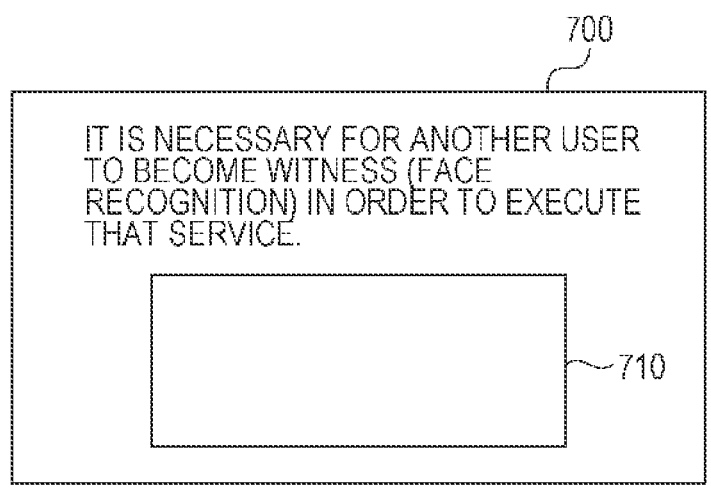
FIG. 7 is a diagram illustrating an example of a multiple-people recognition screen.

In step S220, the process waits for user recognition. This will be described using the examples illustrated in FIGS. 4C, 4D, and 5E. In the example illustrated in FIG. 4C, the information processing apparatus 410 displays that multiple-people recognition is necessary. In the example illustrated in FIG. 4D, the user A400 performs an operation to set, for example, an address in order to use the facsimile service. In the example illustrated in FIG. 5E, upon completion of an operation to set, for example, an address, a message is displayed asking another user to become a witness (multiple-people recognition) before execution of the facsimile service. For example, a multiple-people recognition (witness) screen 700 is displayed. FIG. 7 is a diagram illustrating an example of the multiple-people recognition (witness) screen 700. The message "IT IS NECESSARY FOR ANOTHER USER TO BECOME WITNESS (FACE RECOGNITION) IN ORDER TO EXECUTE THAT SERVICE." is displayed in the multiple-people recognition (witness) screen 700. In a camera image output area 710, an image of a user B402 captured by the camera 420 may be output, and the current camera image may be confirmed. Alternatively, a mark may be displayed to draw attention, thereby causing the camera 420 to capture a face image of the user B402. Since there is no restriction on a witness, the user A400 may ask a person that happens to be there (the user B402) to become a witness.

In step S222, a face image of the user B402 is extracted.

Figure 8A:
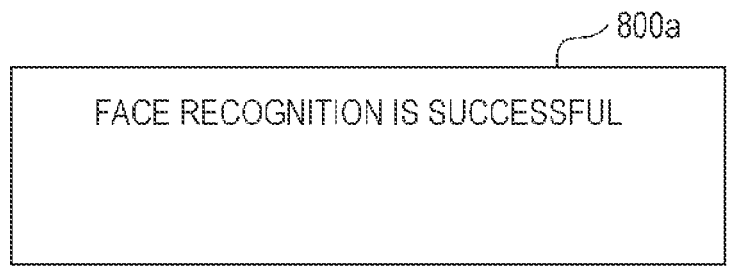
FIGS. 8A to 8D are diagrams illustrating examples of a recognition message display area.
Figure 8B:
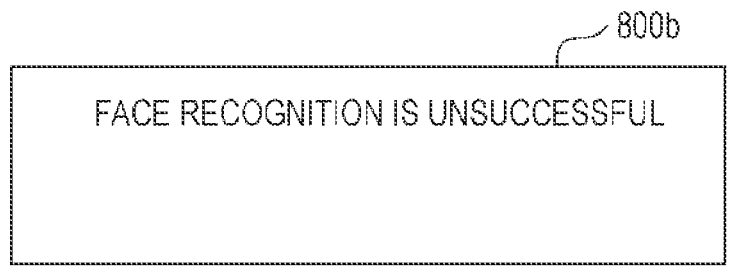
Figure 8C:
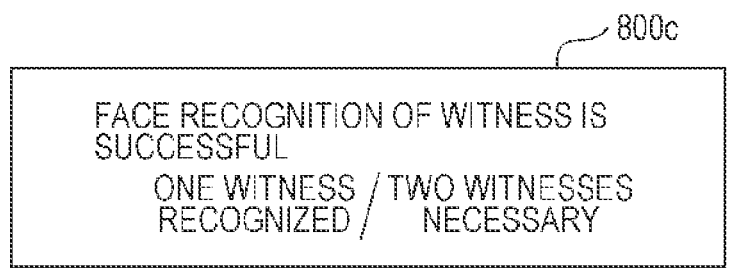
Figure 8D:
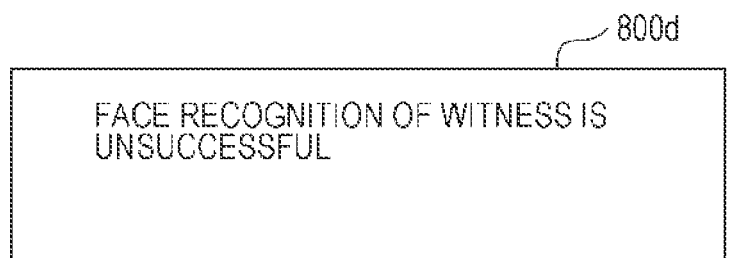

In step S224, it is determined whether it has been recognized that the user B402 is a user different from the user A400. In the case where it has been recognized that the user B402 is a user different from the user A400, the process proceeds to step S226; otherwise, the process returns to step S220. This will be described using the example illustrated in FIG. 5F. In step S222, the camera 420 captures an image of the user B402, and the feature extraction module 114 extracts a face image of the user B402. In step S224, the data comparison module 162 compares the face image of the user B402 with the face image of the user A400 and determines whether the user B402 is a person different from the user A400. In the case where it is determined that the user B402 is a person different from the user A400, for example, a recognition message display area 800*c* is displayed. FIG. 8C is a diagram illustrating an example of the recognition message display area 800*c*. For example, the message "FACE RECOGNITION OF WITNESS IS SUCCESSFUL. ONE WITNESS RECOGNIZED/TWO WITNESSES NECESSARY" is displayed in the recognition message display area 800*c* as a message in the case where it is determined that there is a witness. In the case where it is determined that the user B402 is a person that is not different from the user A400, for example, a recognition message display area 800*d* is displayed. For example, the message "FACE RECOGNITION OF WITNESS IS UNSUCCESSFUL" is displayed in the recognition message display area 800*d* as a message in the case where there is no witness.

Also in this case, the screen display module 124 may display, for example, a facsimile setting screen 900. This is a screen for the user B402, who is a witness, to confirm the details of an operation performed by the user A400. FIG. 9 is a diagram illustrating an example of the facsimile setting screen 900. The facsimile setting screen 900 includes a facsimile setting message area 910 and a facsimile setting area 920. The message "IT IS NECESSARY FOR ANOTHER USER TO BECOME WITNESS (FACE RECOGNITION) IN ORDER TO SEND FACSIMILE TO OUTSIDE. ONE WITNESS RECOGNIZED/SECOND WITNESS BEING PROCESSED" is displayed in the facsimile setting message area 910. The facsimile setting area 920 includes an address field 922, an address name field 924, a communication scheme field 926, a previous page button 928, a next page button 930, and a preview screen 932. The user B402 is able to confirm that the address field 922, the address name field 924, and so forth are correct and that the details of a document to be sent are appropriate using the preview screen 932 or the like.

In step S226, it is determined whether a condition necessary for execution is satisfied. In the case where a condition necessary for execution is satisfied, the process proceeds to step S228; otherwise, the process returns to step S220. For example, a condition necessary for execution of the facsimile service is setting an address or the like.

In step S228, whether the face log function is ON (whether a log storage process by the data storage module 176 has been set) is determined. In the case where the face log function is ON, the process proceeds to step S230; otherwise, the process proceeds to step S232. Note that the setting may be different from that in step S210. In short, the setting may be such that, although the face image or the like of the user A400 is stored as a log (YES in step S210), the face image of the user B402 is not stored as a log (NO in step S228).

In step S230, the face image of the user B402 is stored as a log in the data storage module 176.

In step S232, execution is started. This will be described using the example illustrated in FIG. 5G. Since the witness (user B402) has been recognized as being different from the user A400, the user A400 is permitted to execute the facsimile service. The user B402 may leave.

In step S234, a log out process of the user A400 is performed.

In step S236, the temporarily stored information of the user A400 is deleted from the memory 174. This will be described using the example illustrated in FIG. 5H. Upon completion of the facsimile service in response to an operation performed by the user A400, the stored information is discarded. The processing result of multiple-people recognition is not stored unless the log function is turned ON (YES in step S210 and YES in step S228). In short, after completion of the service, information stored in the memory 174 is deleted.

In step S250 (in the case of NO in step S204), a normal operation is performed. Here, the term "normal operation" refers to the case in which control based on multiple-people recognition by the information processing apparatus 410 is not performed.

Figure 10:
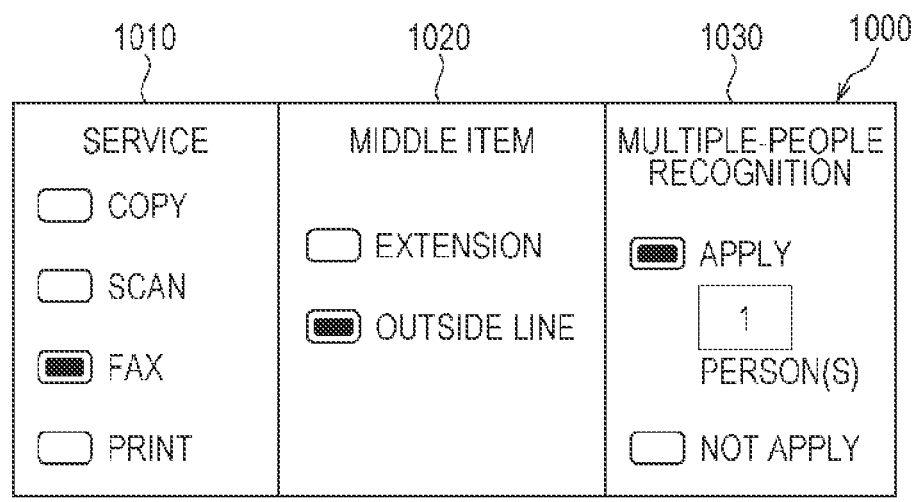
FIG. 10 is a diagram illustrating an example of a target service setting screen.

The setting of an instruction (service, job, etc.) involving control based on multiple-people recognition according to the exemplary embodiment is performed using, for example, a target service setting screen 1000. FIG. 10 is a diagram illustrating an example of the target service setting screen 1000. The screen display module 124 displays the target service setting screen 1000, and the details of the setting are stored in the setting information storage module 172. The target service setting screen 1000 includes a service setting field 1010, a middle item field 1020, and a multiple-people recognition field 1030. The administrator of the main body apparatus performs the setting using the target service setting screen 1000. Although the case of the facsimile service has been discussed in the above-described example, it is possible to set to a copy service, a scan service, a print service, or the like using the interior of the service setting field 1010. In addition, with the middle item field 1020, it is possible not only to set a service, but also to set a service while specifying a condition. For example, as an instruction involving control based on multiple-people recognition, a facsimile service using an outside line may be set. In addition, the number of witnesses may be set using the multiple-people recognition field 1030. Needless to say, the number of witnesses may be set to two or more people, other than one person. In accordance with the setting performed using the target service setting screen 1000, the determination is performed in step S218.

Figure 11:
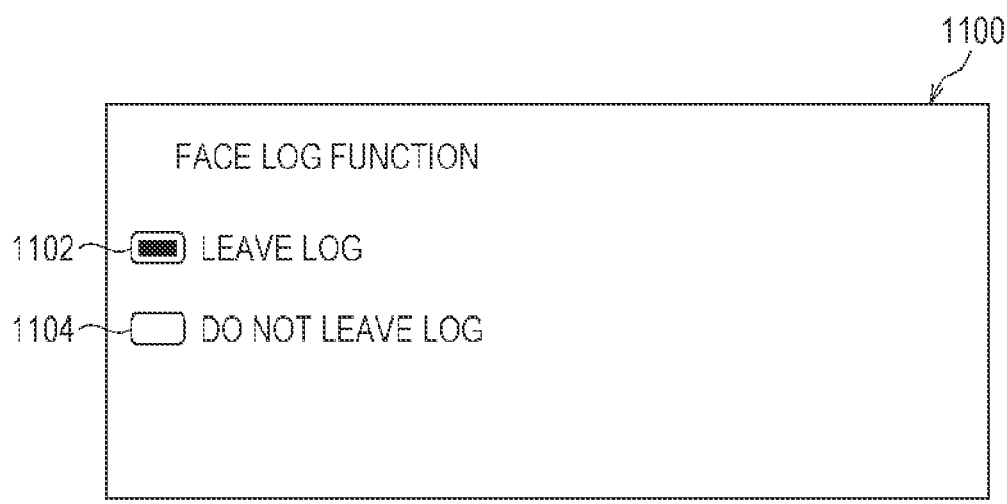
FIG. 11 is a diagram illustrating an example of a log function ON/OFF setting screen.

In addition, the log function setting in the exemplary embodiment is performed using, for example, a log function ON/OFF setting screen 1100. FIG. 11 is a diagram illustrating an example of the log function ON/OFF setting screen 1100. The screen display module 124 displays the log function ON/OFF setting screen 1100, and the details of the setting are stored in the setting information storage module 172. The log function ON/OFF setting screen 1100 includes a "LEAVE LOG" setting check box 1102, and a "DO NOT LEAVE LOG" setting check box 1104. The administrator of the main body apparatus performs the setting using the log function ON/OFF setting screen 1100. Whether to store the face image of the user A400 or the user B402 as a log is settable by selecting the "LEAVE LOG" setting check box 1102 or the "DO NOT LEAVE LOG" setting check box 1104. In addition, for the face image of the user B402, who is a witness, the "DO NOT LEAVE LOG" setting check box 1104 may be set as a default. In accordance with the setting performed using the log function ON/OFF setting screen 1100, the determination is performed in steps S210 and S228.

Referring to FIG. 12, a hardware exemplary configuration of the information processing apparatus according to the exemplary embodiment will be described. The configuration illustrated in FIG. 12 is configured by, for example, a personal computer (PC) or the like. FIG. 12 illustrates a hardware exemplary configuration including a data reading unit 1217 such as a scanner, and a data output unit 1218 such as a printer.

A CPU 1201 is a controller that executes a process in accordance with a computer program describing the execution sequence of various modules described above in the exemplary embodiment, that is, the face detection module 110, the image obtaining module 112, the feature extraction module 114, the operation module 120, the screen operation module 122, the screen display module 124, the main body control module 150, the control module 160, the data comparison module 162, the storage module 170, the setting information storage module 172, the memory 174, and the data storage module 176.

A read-only memory (ROM) 1202 stores a program and arithmetic operation parameters, for example, used by the CPU 1201. A RAM 1203 stores a program used in execution by the CPU 1201, and parameters or the like that appropriately change in the course of execution. These units are interconnected by a host bus 1204 including a CPU bus or the like.

The host bus 1204 is connected to an external bus 1206 such as a peripheral component interconnect/interface (PCI) bus via a bridge 1205.

A keyboard 1208, and a pointing device 1209 such as a mouse are input devices operated by an operator. A display 1210 includes a liquid crystal display (LCD) or a cathode ray tube (CRT), for example, and displays various types of information as text or image information.

A hard disk drive (HDD) 1211 has a built-in hard disk, drives the hard disk, and records or reproduces a program executed by the CPU 1201 and information. The hard disk stores an obtained image, biometric information, a log, and the like. Further, the hard disk stores other various data processing programs and various computer programs.

A drive 1212 reads data or a program recorded in a removable recording medium 1213 such as a magnetic disk, an optical disk, a magneto-optical disk, or a semiconductor memory inserted therein, and supplies the data or program to the RAM 1203 connected via an interface 1207, the external bus 1206, the bridge 1205, and the host bus 1204. The removable recording medium 1213 is also usable as a data recording area similar to the hard disk.

A connection port 1214 is a port that connects an external connection device 1215 and has a connection part such as a Universal Serial Bus (USB) or Institute of Electrical and Electronic Engineers (IEEE) 1394 connection part. The connection port 1214 is connected to the CPU 1201 and the like via the interface 1207 and via the external bus 1206, the bridge 1205, the host bus 1204, and the like. A communication unit 1216 is connected to a communication line and executes a data communication process with the outside. The data reading unit 1217 is a scanner, for example, and executes a document reading process. The data output unit 1218 is a printer, for example, and executes a document data output process.

Note that the hardware configuration of the information processing apparatus illustrated in FIG. 12 indicates only one exemplary configuration. The exemplary embodiment is not limited to the configuration illustrated in FIG. 12 and may have any configuration as long as it is capable of executing the modules described in the exemplary embodiment. For example, some of the modules may be configured by dedicated hardware (such as an application specific integrated circuit (ASIC)), or some of the modules may be included in an external system and connected via communication lines. Further, there may be multiple systems each having the configuration illustrated in FIG. 12, and these systems may be interconnected by communication lines to perform cooperative operation. In addition, the modules may be incorporated in a copier, a facsimile machine, a scanner, a printer, a multi-functional machine, or the like.

In addition, in the above description of the exemplary embodiment, the expressions "greater than or equal to", "less than or equal to", "greater than", and "less than", which are used in comparison with predetermine values, may be "greater than", "less than", "greater than or equal to", and "less than or equal to", respectively, as long as there is no conflict in their combinations.

In the case where an instruction accepted by the screen operation module 122 is a predetermined instruction, a determination process by the data comparison module 162 may be performed. In addition, upon power activation or deactivation of the main body apparatus, a determination process by the data comparison module 162 may be performed. In addition, in the case of an instruction to perform the settings of the main body apparatus, two or more witnesses may be involved. For example, the data comparison module 162 may determine whether first biometric information, second biometric information, and third biometric information are different, and, in the case where it is determined that these three items of biometric information are different, an instruction accepted by the screen operation module 122 may be permitted.

In addition, although the face image of the user A400 in multiple-people recognition is extracted from an image captured at the time of log in in the flowcharts illustrated in FIGS. 2 and 3, if an instruction involving multiple-people recognition is given, an image of the user A400 and the user B402 may be captured. In addition, an image may be captured at the time the user A400 logs in; further, at the time an instruction involving multiple-people recognition is given, an image of the user A400 and the user B402 may be captured, and whether the face image of the user A400 in the image captured at the time of log in is the same as the face of the user A400 in the image captured later at the time an instruction involving multiple-people recognition is given may be determined. In short, the fact that the face image of the user A400 in the image captured at the time of log in is the same as the face image of the user A400 in the image captured later at the time an instruction involving multiple-people recognition is given, and the fact that the face image of the user A400 is different from the face image of the user B402 may serve as conditions for execution.

Note that the technology described in the related art may be adopted as the details of processing of each of the modules.

Note that the described program may be stored in a recording medium and provided, or the program may be provided by a communication unit. In that case, for example, the above-described program may be regarded as an invention of a "computer readable recording medium storing a program".

The term "computer readable recording medium storing a program" refers to a computer readable recording medium on which a program is recorded, which is used to install, execute, and circulate the program.

Note that the recording medium includes, for example, a digital versatile disc (DVD) including "DVD-R, DVD-RW, DVD-RAM, etc." which are standards defined by the DVD Forum, and "DVD+R, DVD+RW, etc." which are standards defined by DVD+RW, a compact disc (CD) including a read-only memory (CD-ROM), a CD-recordable (CD-R), a CD-rewritable (CD-RW), etc., a Blu-ray Disc (BD; registered trademark), a magneto-optical disk (MO), a flexible disk (FD), a magnetic tape, a hard disk, a ROM, an electrically erasable programmable read-only memory (EEPROM; registered trademark), a flash memory, a RAM, a Secure Digital (SD) memory card, and the like.

The above-mentioned program or part of it may be recorded in the above-mentioned recording medium and may be saved, circulated, and the like. In addition, the above-mentioned program or part of it may be transmitted by communication using a wired network used in, for example, a local area network (LAN), a metropolitan area network (MAN), a wide area network (WAN), the Internet, an intranet, an extranet, or the like, a wireless communication network, or a transmission medium including a combination of these. Alternatively, the above-mentioned program or part of it may be superimposed on a carrier and carried.

Further, the above-mentioned program may be part of another program, or may be recorded along with a separate program. In addition, the above-mentioned program may be divided into pieces and recorded on multiple recording media. The above-mentioned program may be recorded in any mode as long as it is recoverable, such that the above-mentioned program may be compressed or encrypted.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   at least one processor configured to execute:
      an instruction accepting unit configured to accept an instruction from a user;
      an obtaining unit configured to obtain an image;
      an extraction unit configured to extract first biometric information and second biometric information from the image obtained by the obtaining unit;
      a determination unit configured to determine whether the first biometric information and the second biometric information are different; and
      a permission unit configured to permit execution of the instruction accepted by the instruction accepting unit in a case where the determination unit determines that the first biometric information and the second biometric information are different.

2. The information processing apparatus according to claim 1, wherein the permission unit is configured to not permit execution of the instruction accepted by the instruction accepting unit in a case where the determination unit does not determine that the first biometric information and the second biometric information are different.

3. The information processing apparatus according to claim 1, further comprising a memory configured to store the instruction accepted by the instruction accepting unit and the first biometric information as a log.

4. The information processing apparatus according to claim 2, further comprising a memory configured to stored the instruction accepted by the instruction accepting unit and the first biometric information as a log.

5. The information processing apparatus according to claim 3, wherein the memory is configured to not store the second biometric information as a log.

6. The information processing apparatus according to claim 4, wherein the memory is configured to not store the second biometric information as a log.

7. An information processing method comprising:
   accepting an instruction from a user;
   obtaining an image;
   extracting first biometric information and second biometric information from the obtained image;
   determining whether the first biometric information and the second biometric information are different; and
   permitting execution of the accepted instruction in a case where it is determined that the first biometric information and the second biometric information are different.

8. A non-transitory computer readable medium storing a program causing a computer to execute a process for processing information, the process comprising:
   accepting an instruction from a user;
   obtaining an image;
   extracting first biometric information and second biometric information from the obtained image;
   determining whether the first biometric information and the second biometric information are different; and
   permitting execution of the accepted instruction in a case where it is determined that the first biometric information and the second biometric information are different.

9. The information processing apparatus according to claim 3, wherein the memory is configured to store the instruction accepted by the instruction accepting unit, the first biometric information, and the second biometric information as a log.

10. The information processing apparatus according to claim 4, wherein the memory is configured to store the instruction accepted by the instruction accepting unit, the first biometric information, and the second biometric information as a log.

* * * * *